(12) United States Patent
Herrera, Jr. et al.

(10) Patent No.: US 10,542,845 B2
(45) Date of Patent: Jan. 28, 2020

(54) FOODSTUFF RECEPTACLE FOR BEVERAGE CONTAINER

(71) Applicants: Juan J. Herrera, Jr., Bridgeville, PA (US); Robert Gomez, III, Miami, FL (US)

(72) Inventors: Juan J. Herrera, Jr., Bridgeville, PA (US); Robert Gomez, III, Miami, FL (US)

(73) Assignee: Juan J. Herrera, Jr., Bridgeville, PA (US)

( * ) Notice: Subject to any disclaimer, the term of this patent is extended or adjusted under 35 U.S.C. 154(b) by 0 days.

(21) Appl. No.: 14/707,136

(22) Filed: May 8, 2015

(65) Prior Publication Data

US 2016/0324371 A1 Nov. 10, 2016

(51) Int. Cl.
| | | |
|---|---|---|
| A47J 47/02 | (2006.01) |
| B65D 25/04 | (2006.01) |
| B65D 51/28 | (2006.01) |
| B65D 25/20 | (2006.01) |

(52) U.S. Cl.
CPC ............ *A47J 47/02* (2013.01); *B65D 25/04* (2013.01); *B65D 25/20* (2013.01); *B65D 51/28* (2013.01)

(58) Field of Classification Search
CPC ........ A47G 19/06; B65D 5/6602; B65D 5/64; B65D 5/0209; B65D 51/28; B65D 2231/022
See application file for complete search history.

(56) References Cited

U.S. PATENT DOCUMENTS

| | | | |
|---|---|---|---|
| 4,183,444 A | 1/1980 | English et al. | |
| 5,137,210 A | 8/1992 | Hibbs | |
| 5,180,079 A * | 1/1993 | Jeng ..................... | A47G 19/065 206/217 |
| 5,722,558 A | 3/1998 | Thompson | |
| 5,725,117 A * | 3/1998 | Berjis ................ | A47G 19/2272 220/4.03 |
| 5,984,131 A | 11/1999 | Krueger et al. | |
| 6,360,885 B1 | 3/2002 | Krueger et al. | |
| 6,425,480 B1 | 7/2002 | Krueger et al. | |
| 6,427,864 B1 | 8/2002 | Asselin | |
| 7,182,242 B2 * | 2/2007 | Cai ....................... | A47G 19/065 206/217 |
| 8,172,103 B2 * | 5/2012 | Spyros .................. | A47G 19/00 206/217 |
| 8,186,538 B2 | 5/2012 | MacCarthy | |
| 8,870,010 B2 * | 10/2014 | Buck .................. | A47G 19/2205 206/217 |
| 9,038,845 B1 * | 5/2015 | Buck ...................... | B65D 51/28 220/521 |
| 2012/0273500 A1 * | 11/2012 | Yao ........................ | B65D 51/28 220/521 |

* cited by examiner

*Primary Examiner* — Andrew T Kirsch
*Assistant Examiner* — Don M Anderson
(74) *Attorney, Agent, or Firm* — The Webb Law Firm

(57) ABSTRACT

A receptacle for holding a foodstuff that is attachable to a beverage container is disclosed. The receptacle of the present disclosure allows a person to be able to hold a beverage and a foodstuff in one hand.

3 Claims, 14 Drawing Sheets

FOODSTUFF RECEPTACLE FOR BEVERAGE CONTAINER

BACKGROUND OF THE INVENTION

1. Field of the Disclosure

The present disclosure relates generally to a receptacle for holding a foodstuff. More particularly, the present disclosure relates to a receptacle for holding a foodstuff that is attachable to a beverage container.

2. Description of the Related Art

Conventional containers or cups for beverages, such as soft drinks, are used for containing the beverage only. To enjoy eating food, such as a meal or snacks, while drinking, one has to put down the drink cup in hand to hold the food and then eat. Such exchanging process of beverage container to food can be very inconvenient, especially when one is not sitting down at a table. Examples of activities where it is convenient or essential for the recipient of the food items and beverage to be able to keep one hand free for some purpose include traveling in a car, attending an entertainment event, being outdoors, holding a baby, or a similar activity where there is no proper place for putting cups and food. Additionally, during these activities, it is very difficult to hold both a beverage container and food. Eating and drinking during these activities frequently result in spillage and other undesirable consequences.

Thus, it is desirable to create a device that allows a person to be able to hold a beverage and a foodstuff in one hand.

SUMMARY OF THE INVENTION

The present disclosure provides a receptacle for holding a foodstuff that is attachable to a beverage container. The receptacle of the present disclosure allows a person to be able to hold a beverage and a foodstuff in one hand.

In accordance with an embodiment of the present invention, a receptacle removably attachable to a container defining an interior for receiving a beverage includes a lid component having a straw receiving portion located at a peripheral portion of the lid component and a first connection portion; and a wall component having a second connection portion, the wall component transitionable between a first configuration in which the wall component is flat and a second configuration in which the wall component is connectable to the lid component.

In one configuration, with the wall component in the second configuration, the second connection portion engages the first connection portion to connect the wall component to the lid component. In another configuration, the wall component includes a third connection portion, and wherein, with the wall component in the second configuration, the third connection portion engages a portion of the straw receiving portion to connect the wall component to the lid component. In yet another configuration, the wall component includes a divider wall, and wherein, with the wall component in the second configuration and connected to the lid component, the divider wall, the wall component, and the lid component together define a first compartment and a second compartment. In one configuration, the wall component includes a cover, and wherein, with the wall component in the second configuration and connected to the lid component, the cover is transitionable between an open position and a closed position in which the cover encloses the first compartment and the second compartment. In another configuration, a first foodstuff is storable within the first compartment. In yet another configuration, a second foodstuff is storable within the second compartment. In one configuration, the lid component includes a condiment compartment. In another configuration, the peripheral portion of the lid component includes a lid component wall that defines a first cavity therein. In yet another configuration, the condiment compartment includes a condiment compartment wall that defines a second cavity therein, the second cavity spaced apart from the first cavity. In one configuration, a condiment is receivable within the condiment compartment. In another configuration, the straw receiving portion extends outward from the lid component wall at an angle.

In accordance with another embodiment of the present invention, a receptacle removably attachable to a container defining an interior for receiving a beverage includes a base portion having a straw receiving portion located at a peripheral portion of the base portion, the straw receiving portion extending outward from the base portion at an angle; a wall portion extending vertically from the peripheral portion of the base potion, the wall portion defining a first compartment therein; a condiment compartment having a condiment compartment wall that defines a second compartment therein, the second compartment spaced apart from the first compartment; and a first finger grip indentation disposed on a first side of the wall portion.

In one configuration, the receptacle includes a divider wall, and wherein the divider wall and the wall portion together define a first receiving portion and a second receiving portion. In another configuration, a first foodstuff is storable within the first receiving portion. In yet another configuration, a second foodstuff is storable within the second receiving portion. In one configuration, the receptacle includes a cover removably attachable to the wall portion, and wherein, with the cover attached to the wall portion, the cover encloses the first compartment and the second compartment. In another configuration, the receptacle includes a second finger grip indentation disposed on a second side of the wall portion. In yet another configuration, the second finger grip indentation is spaced apart from the first finger grip indentation. In another configuration, a condiment is receivable within the condiment compartment.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION

Figure 1:
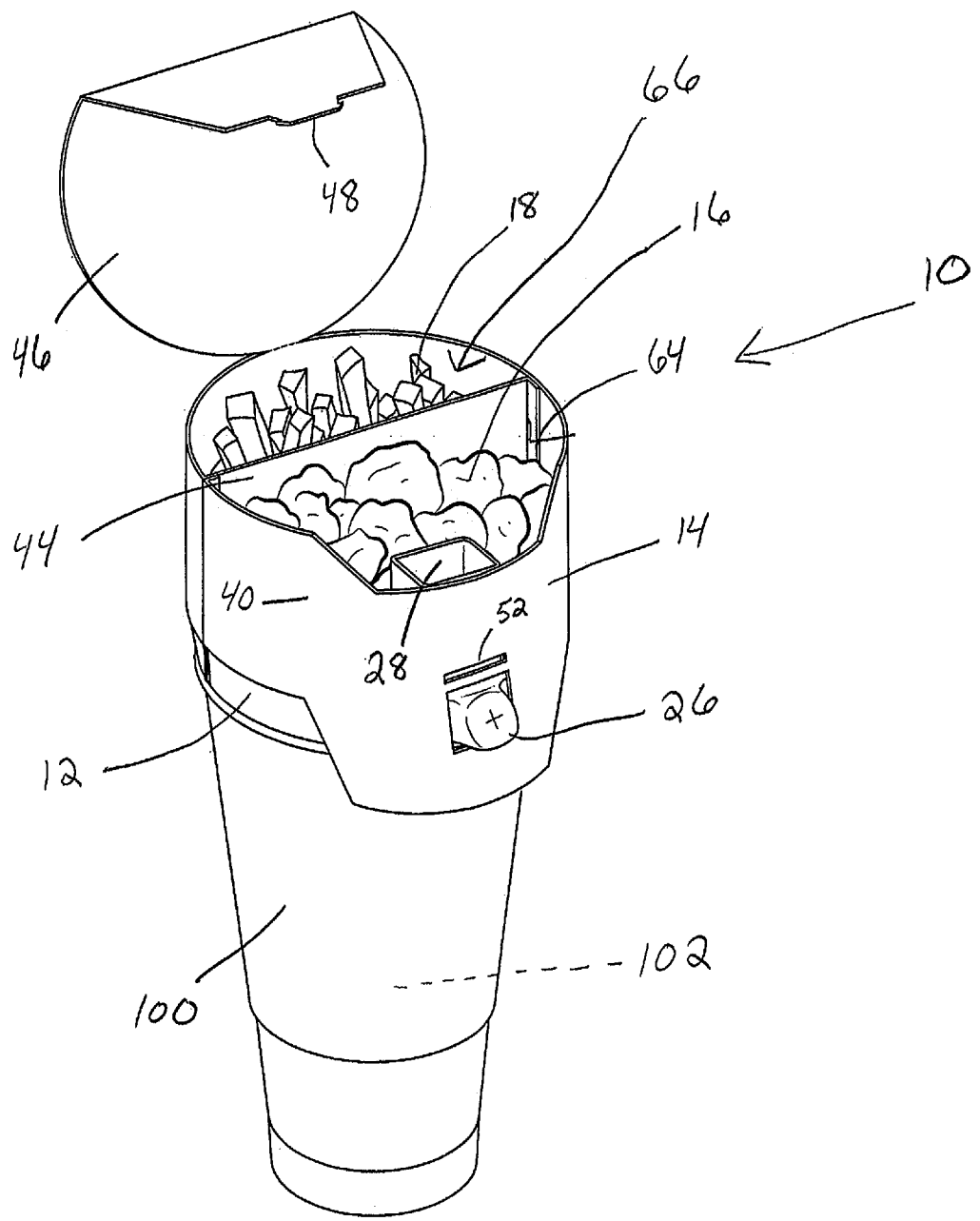
FIG. 1 is a perspective view of a receptacle storing a first foodstuff and a second foodstuff and attached to a beverage container in accordance with an embodiment of the present invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Figure 2:
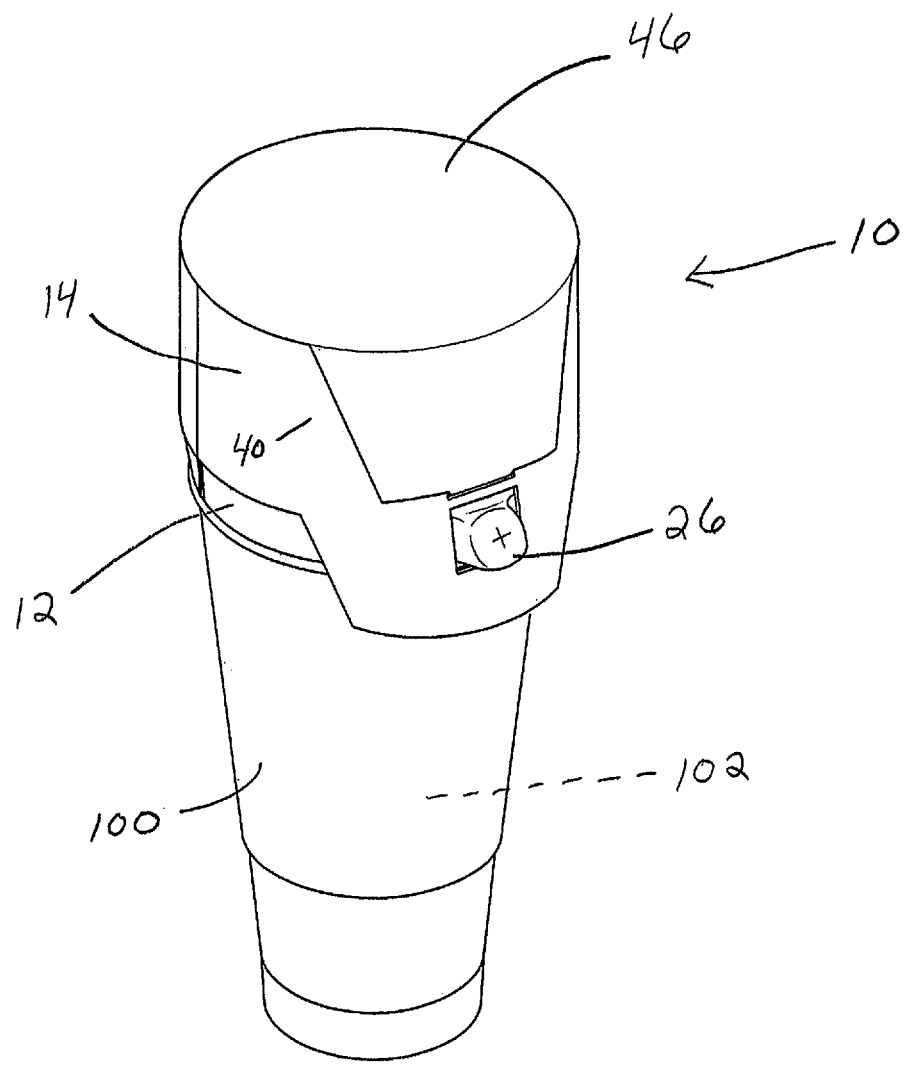
FIG. 2 is a perspective view of a receptacle with a cover in a closed position and attached to a beverage container in accordance with an embodiment of the present invention.
Figure 3:
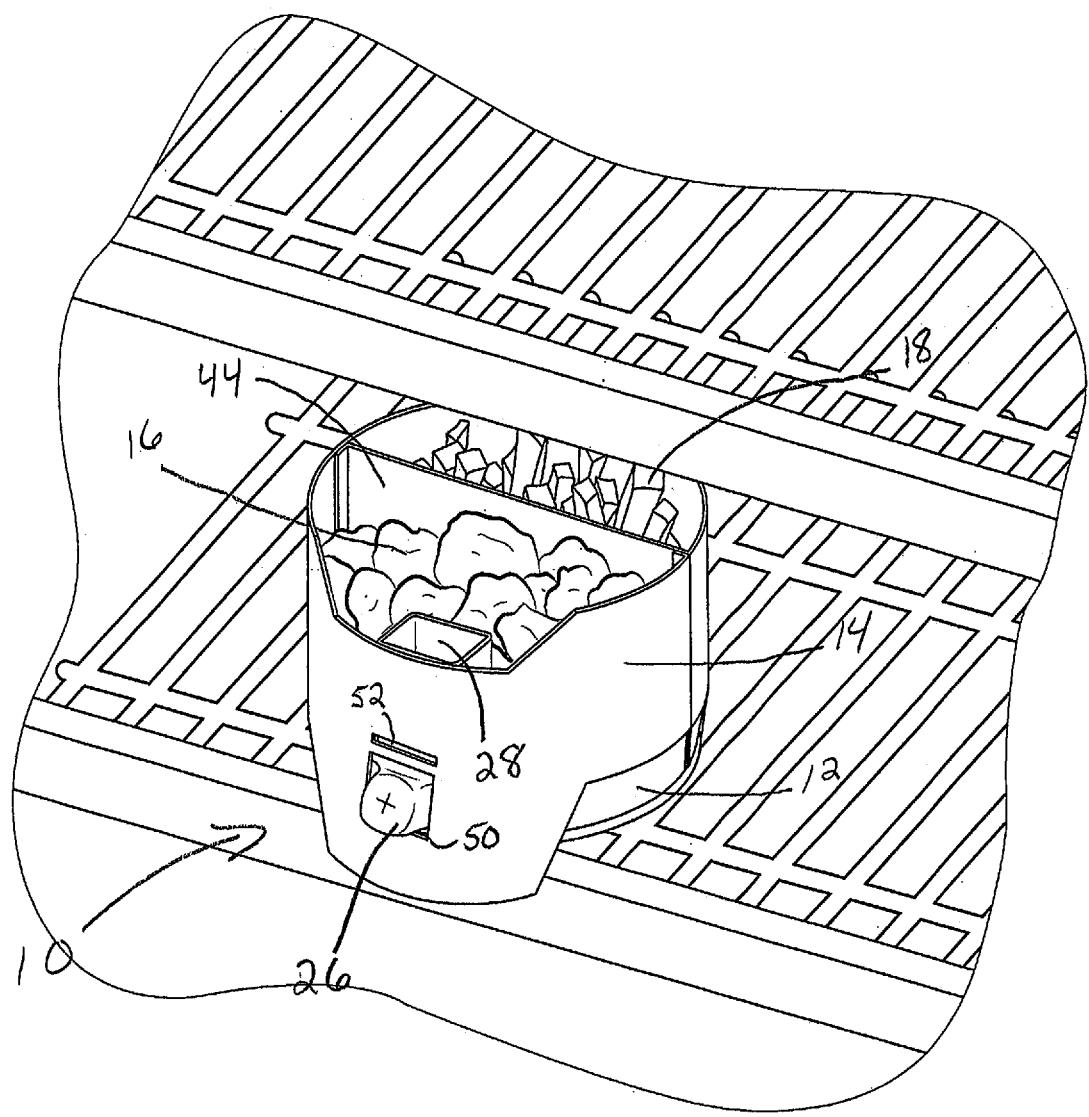
FIG. 3 is a perspective view of a receptacle storing a first foodstuff and a second foodstuff and stored in a refrigerator in accordance with an embodiment of the present invention.
Figure 4:
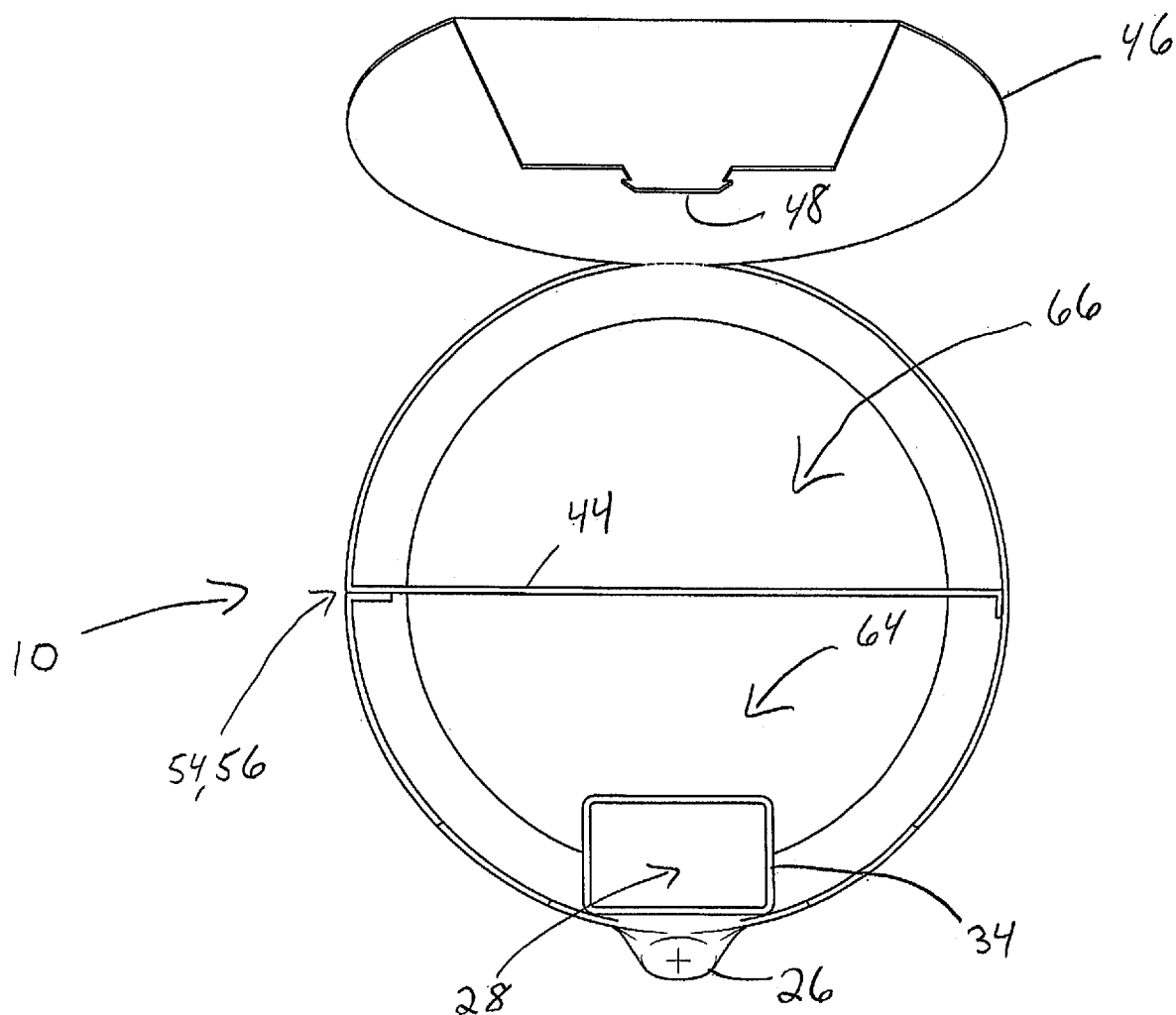
FIG. 4 is a top elevation view of a receptacle in accordance with an embodiment of the present invention.
Figure 5:
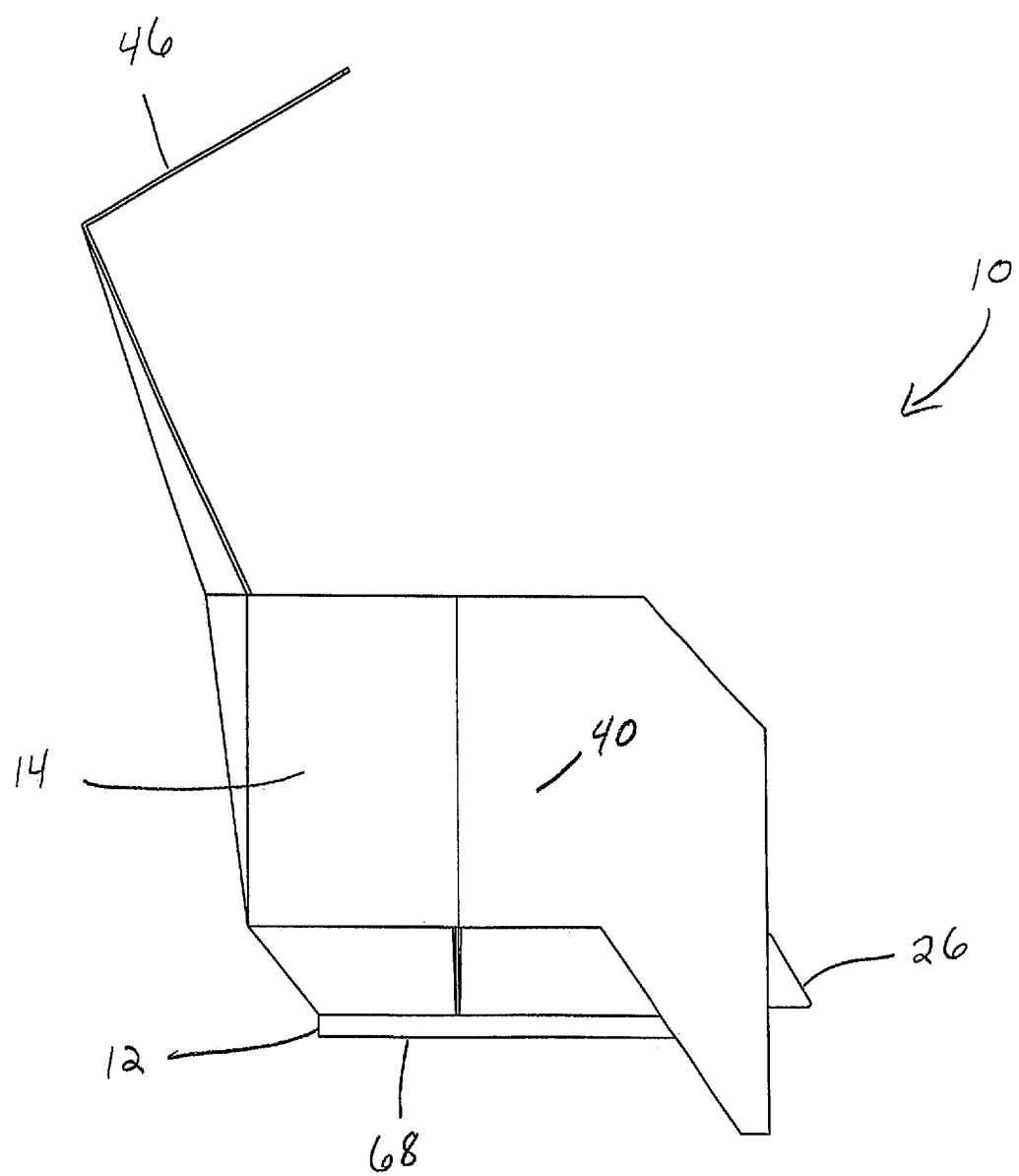
FIG. 5 is a side elevation view of a receptacle in accordance with an embodiment of the present invention.

FIGS. 1-7, 12, and 14 illustrate an exemplary embodiment of a receptacle of the present disclosure. Referring to FIGS. 1 and 2, a receptacle 10 of the present disclosure is adapted to hold, contain, and/or store a foodstuff. For example, the receptacle 10 is adapted to hold a first foodstuff 16 and/or a second foodstuff 18 therein as shown in FIGS. 1 and 3. The receptacle 10 is attachable to a container 100 defining an interior 102 for receiving a beverage. The receptacle 10 of the present disclosure allows a person to be able to hold a beverage and a foodstuff in one hand.

Referring to FIGS. 1-7, 12, and 14, in one embodiment, a receptacle 10 generally includes a lid component 12 and a wall component 14. The lid component 12 includes a peripheral portion 20, a lid component wall or sidewall 22, a bottom wall 24, a straw receiving portion 26 located at the peripheral portion 20, a condiment compartment 28, and a first connection portion 30. The sidewall 22 is defined at the peripheral portion 20 of the lid component 12. The sidewall 22 and the bottom wall 24 define a first cavity 32 therein. In one embodiment, the first connection portion 30 comprises a plurality of slots 38.

The condiment compartment 28 includes a condiment compartment wall 34 that defines a second cavity 36 therein. The second cavity 36 is spaced apart from the first cavity 32. In this manner, the first cavity 32 of the lid component 12 is capable of storing a foodstuff 16, 18 and the second cavity 36 of the condiment compartment 28 provides a separate compartment for storing a condiment.

The straw receiving portion 26 is located at the peripheral portion 20 of the lid component 12 so that insertion of a straw through the straw receiving portion 26 of the lid component 12 does not interfere with the space of the lid component 12, i.e., the first cavity 32, for containing a foodstuff 16, 18. For example, a conventional lid for a beverage container contains a straw hole in the middle of the lid. Such an orientation of the straw hole interferes with the top of the lid. The straw receiving portion 26 of the receptacle 10 of the present disclosure is positioned at the peripheral portion 20 so that the entirety of the first cavity 32 of the lid component 12 is able to receive a foodstuff 16, 18 with no interference from a straw. The lid component 12 of the present disclosure provides a first cavity 32 that utilizes a maximum surface area for receiving a foodstuff 16, 18.

In one embodiment, the straw receiving portion 26 extends outward from the sidewall 22 of the lid component 12 at an angle. In this manner, a straw can be inserted through the straw receiving portion 26 at the peripheral portion 20 of the lid component 12 at an angle that allows the straw to be properly received within the beverage container 100.

In one embodiment, the lid component 12 may be formed of various plastics or similar materials known in the art that are used to form lids for beverage containers. For example, the lid component 12 may be formed of polystyrene, a styrene based material, or other similar material. In one embodiment, the lid component 12 is made of a material that has a sufficient rigidity to support a foodstuff 16, 18. In one embodiment, the lid component 12 is made of an insulating material. In other embodiments, the lid component 12 can be made of a biodegradable material or a recyclable material.

The lid components 12 of the present disclosure can be easily stacked during storage. Thus, the lid component 12 of the present disclosure reduces the amount of space that numerous lid components 12 occupy during storage.

Referring to FIGS. 1-7, 12, and 14, in one embodiment, the wall component 14 includes a sidewall 40 having a second connection portion 42, a divider wall 44, a cover 46 having a cover locking tab 48, a third connection portion 50, a slot 52, a first securement wall 54, and a second securement wall 56. In one embodiment, the second connection portion 42 comprises a plurality of locking tabs 58. In one embodiment, the locking tabs 58 are engageable with respective slots 38, i.e., first connection portions 30, of the lid component 12 for securing the wall component 14 to the lid component 12 as described in more detail below.

The wall component 14 is transitionable between a first configuration (FIG. 11) in which the wall component 14 is flat and a second configuration (FIG. 12) in which the wall component 14 is connectable to the lid component 12. Advantageously, by having a wall component 14 that is flat in the first configuration, any number of wall components 14 can be easily stacked during storage. Thus, the wall component 14 of the present disclosure reduces the amount of space that numerous wall components 14 occupy during storage.

Figure 11:
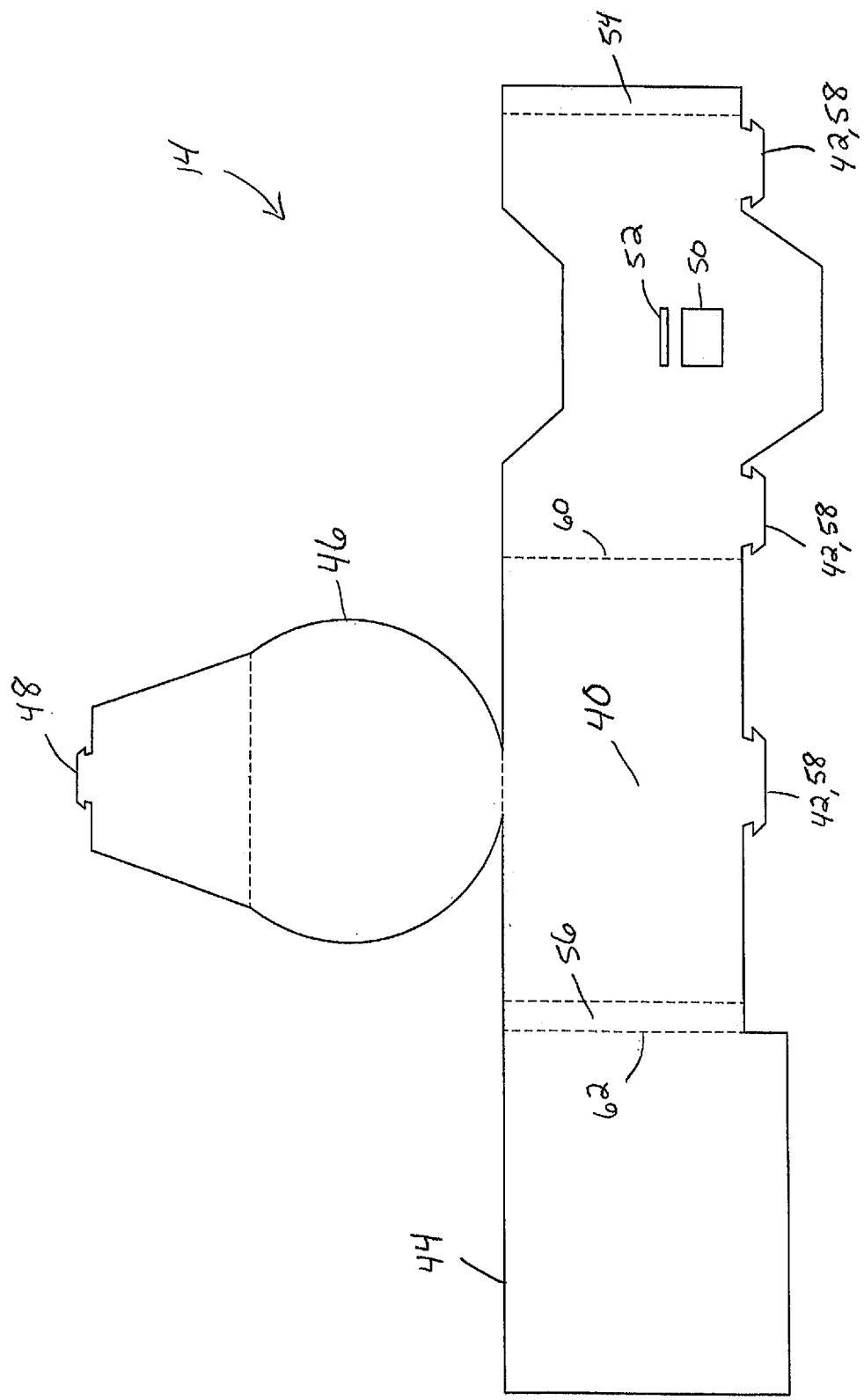
FIG. 11 is an elevation view of a wall component of a receptacle in a first configuration in accordance with an embodiment of the present invention.
Figure 12:
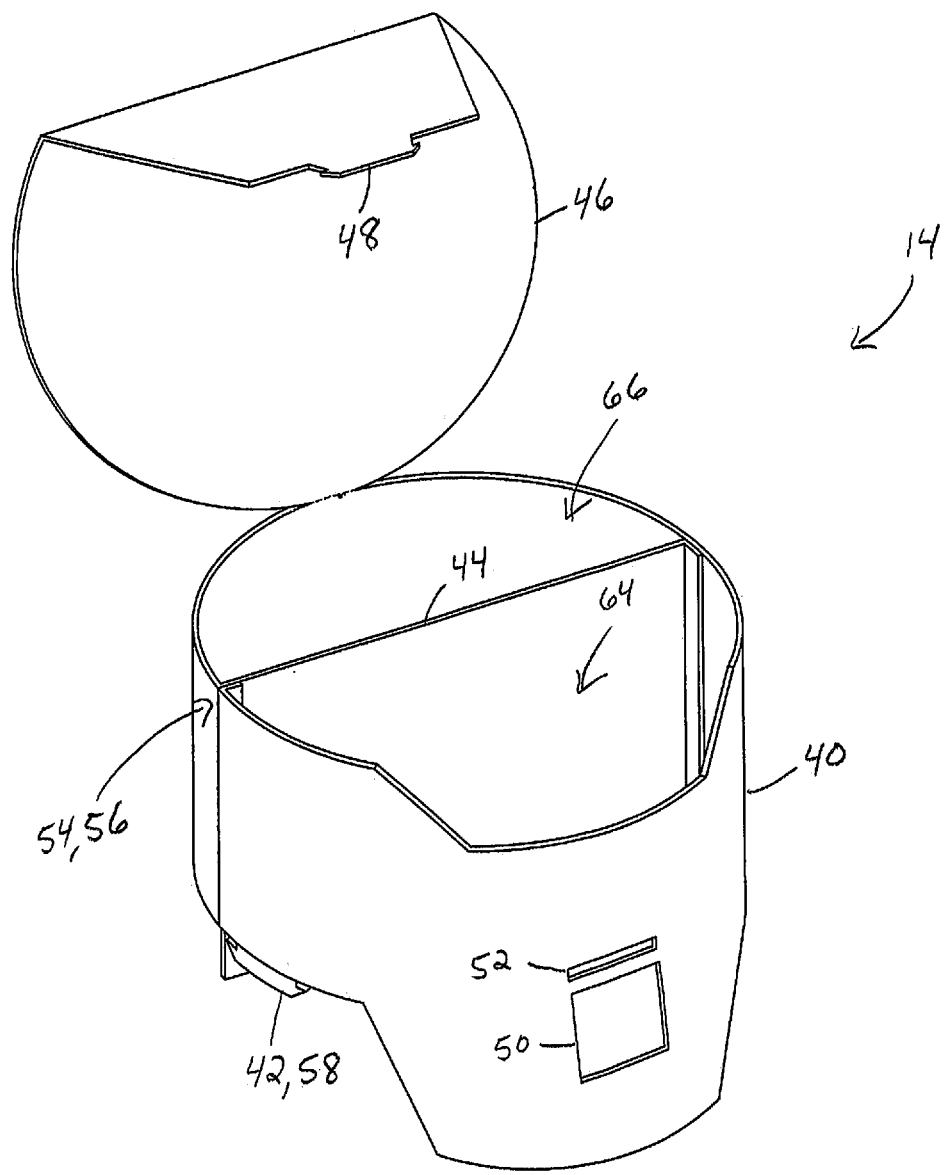
FIG. 12 is a perspective view of a wall component of a receptacle in a second configuration in accordance with an embodiment of the present invention.

To transition the wall component 14 from the first configuration (FIG. 11) to the second configuration (FIG. 12), the sidewall 40 may be folded at first fold line 60 (FIG. 11) and second fold line 62 (FIG. 11). The first fold line 60 and the second fold line 62 help allow a user to fold the sidewall 40 of the wall component 14 to a cylindrical shape as shown in FIG. 12. To secure the wall component 14 in the second configuration (FIG. 12), the first securement wall 54 is securable to the second securement wall 56. For example, one of the first securement wall 54 and the second securement wall 56 may include an adhesive. In this manner, the sidewall 40 of the wall component 14 may be folded into the second configuration (FIG. 12) with the divider wall 44 bisecting the sidewall 40 and then the first securement wall 54 can be adhesively secured to the second securement wall 56. In one embodiment, the adhesive is protected by a peel-off layer, similar to an adhesive bandage, which would be removed before securing the wall component 14 in the second configuration (FIG. 12).

In one embodiment, the lid component 12 includes an additional mechanism to receive the divider wall 44. In one embodiment, the lid component 12 includes a divider wall slot 39 (FIG. 14) defined within the bottom wall 24 of the lid component 12. During assembly of the wall component 14 and the lid component 12, the divider wall 44 is securely receivable within the divider wall slot 39 to further secure the wall component 14 and the lid component 12 there together.

In one embodiment, the wall component 14 may be formed of various plastics, fiber materials, or similar materials known in the art. For example, the wall component 14 may be formed of polystyrene, a styrene based material, a fiber based material, or other similar material. In one embodiment, the wall component 14 is made of a material that has a sufficient rigidity to support a foodstuff 16, 18. In one embodiment, the wall component 14 is made of an insulating material. In other embodiments, the wall component 14 can be made of a biodegradable material or a recyclable material.

In one embodiment, the wall component 14 and the lid component 12 are formed of the same material. In other embodiments, the wall component 14 and the lid component 12 are formed of different materials. For example, the wall component 14 may be formed of a first material and the lid component 12 may be formed of a second material, wherein the first material is more rigid than the second material.

Figure 6:
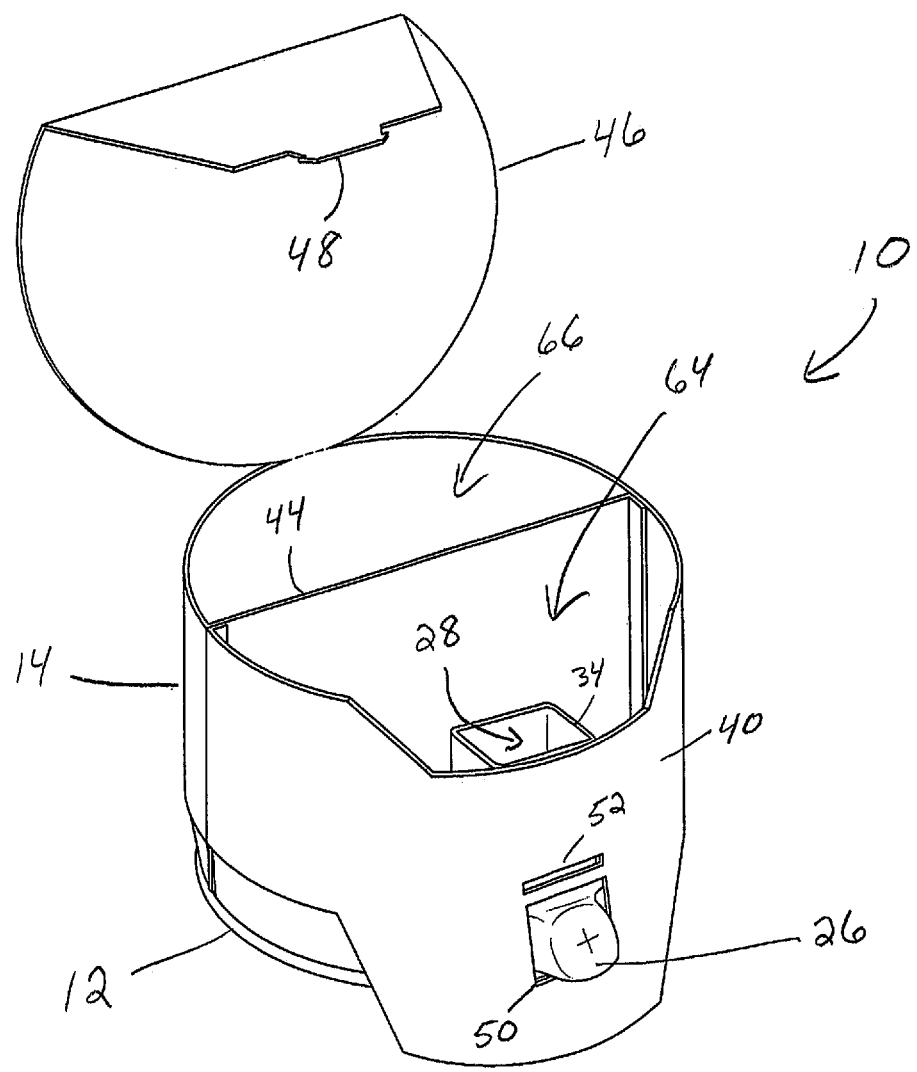
FIG. 6 is a perspective view of a receptacle in accordance with an embodiment of the present invention.
Figure 7:
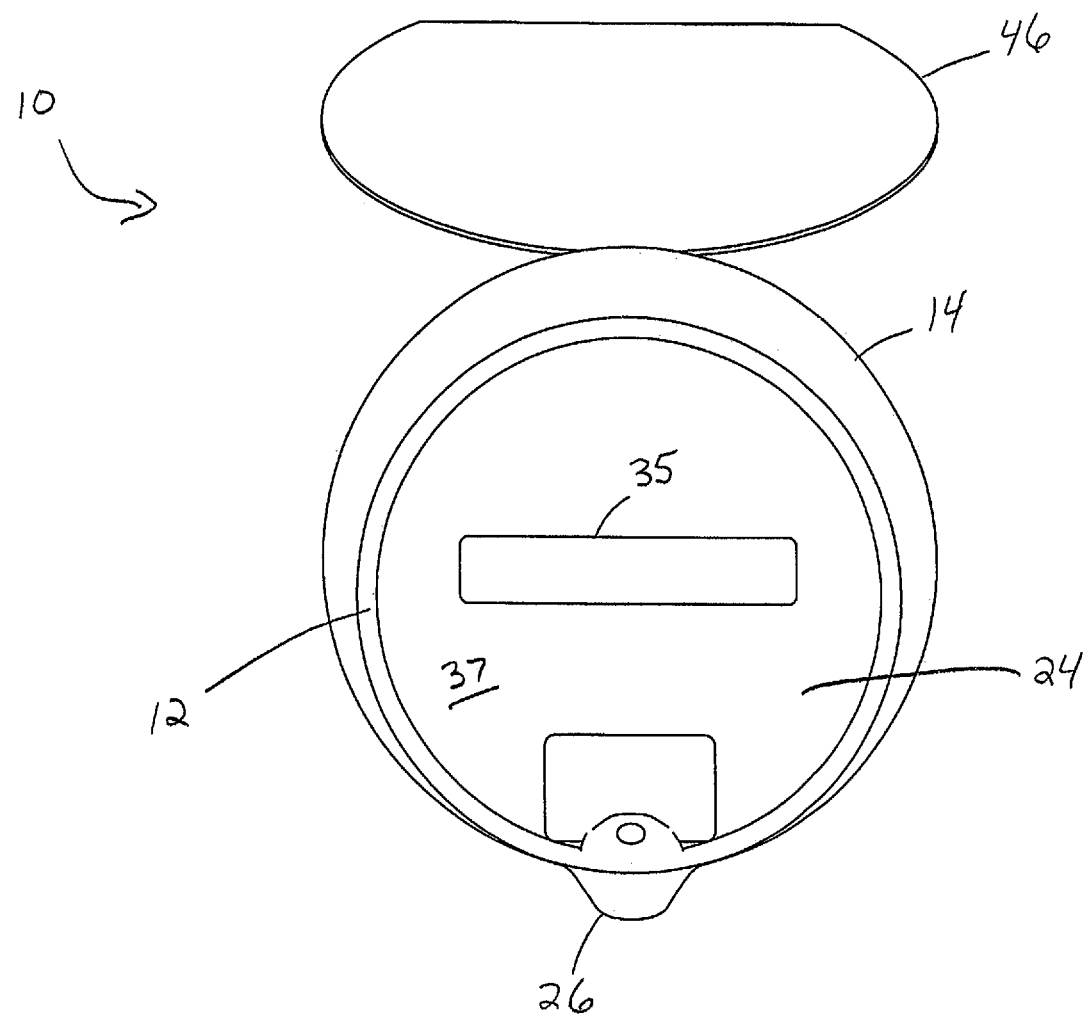
FIG. 7 is a bottom elevation view of a receptacle in accordance with an embodiment of the present invention.
Figure 14:
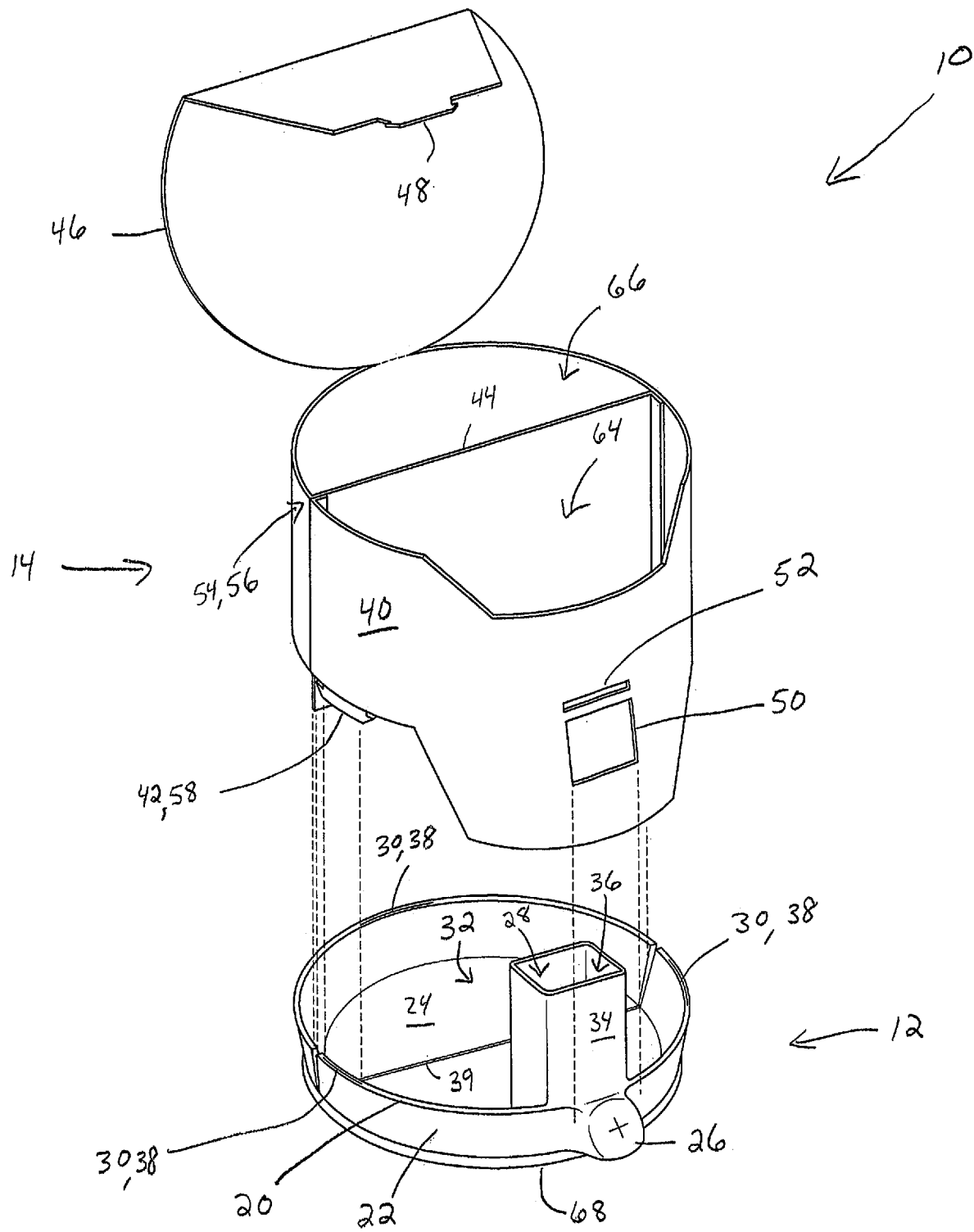
FIG. 14 is an exploded, perspective view of a wall component and a lid component of a receptacle in accordance with an embodiment of the present invention.

Referring to FIGS. 6 and 14, with the wall component 14 in the second configuration, the second connection portion 42 engages the first connection portion 30 to connect and secure the wall component 14 to the lid component 12. For example, in one embodiment, the locking tabs 58 of the wall component 14 are engageable with respective slots 38 of the lid component 12 for securing the wall component 14 to the lid component 12. In one embodiment, the locking tabs 58 are resiliently deformable and have a width greater than the width of a respective slot 38. In this manner, as a user exerts a force to insert a locking tab 58 into a respective slot 38, the locking tab 58 deforms while passing the slot 38. Further, once the locking tab 58 is within the slot 38, the locking tab 58 returns to its original position, e.g., with a width greater than the slot 38, thereby locking the locking tab 58 within a respective slot 38 and securing the wall component 14 to the lid component 12.

In some embodiments, the wall component 14 includes additional mechanisms to secure the wall component 14 to the lid component 12. For example, with the wall component 14 in the second configuration, the third connection portion 50 engages a portion of the straw receiving portion 26 to connect and secure the wall component 14 to the lid component 12. In one embodiment, the third connection portion 50 receives the straw receiving portion 26 therethrough as shown in FIGS. 1 and 6. In this manner, the third connection portion 50 acts as a physical barrier to prevent wall component 14 from significant relative movement relative to the lid component 12.

Referring to FIGS. 1 and 6, with the wall component 14 in the second configuration and connected to the lid component 12, the divider wall 44, the wall component 14, and the lid component 12 together define a first compartment 64 and a second compartment 66.

In this manner, a first foodstuff 16 is storable within the first compartment 64 and a second foodstuff 18 is storable within the second compartment 66. Additionally, a condiment is receivable within the condiment compartment 28. For example, a receptacle 10 of the present disclosure may be used by a food provider to place chicken nuggets, i.e., a first foodstuff 16, within the first compartment 64, french fries, i.e., a second foodstuff 18, within the second compartment 66, and ketchup and/or barbecue sauce, i.e., a condiment, within the condiment compartment 28. The receptacle 10 of the present disclosure can be used to contain any foodstuffs. Also, the first compartment 64, the second compartment 66, and the condiment compartment 28 of the receptacle 10 of the present disclosure can be used to contain any combination of foodstuffs.

In other embodiments, additional divider walls could be positioned within the receptacle 10 to form any number of compartments for containing any number of foodstuffs. For example, a second divider wall could be positioned within the receptacle 10 bisecting the divider wall 44 to form four separate compartments for containing foodstuffs.

Referring to FIGS. 1 and 2, with the wall component 14 in the second configuration and connected to the lid component 12, the cover 46 is transitionable between an open position (FIG. 1) and a closed position (FIG. 2) in which the cover 46 encloses the first compartment 64 and the second compartment 66. Advantageously, in this manner, foodstuffs 16, 18 served within the receptacle 10 can be enclosed and sealed within the receptacle 10 until a user desires to eat the foodstuffs 16, 18 therein. The cover 46 encloses the foodstuffs 16, 18 within the receptacle 10 thereby keeping the foodstuffs 16, 18 at a warm temperature and preventing undesirables from entering the receptacle 10.

In one embodiment, the wall component 14 includes an additional mechanism to receive a portion of the cover 46 to secure the cover 46 in the closed position (FIG. 2). In one embodiment, the wall component 14 includes a slot 52 defined within a portion of the sidewall 40 of the wall component 14. To securely close the cover 46 into the closed position, the cover locking tab 48 is securely receivable within the slot 52 to further secure the cover 46 in the closed position (FIG. 2). The engagement of the cover locking tab 48 within the slot 52 is such that the cover 46 can be easily transitioned between the open position (FIG. 1) and the closed position (FIG. 2).

A receptacle 10 of the present disclosure also can be used once a beverage is finished within the container 100. For example, a user can remove the receptacle 10 from the container 100 and store and/or refrigerate the foodstuffs 16, 18 within the receptacle 10 until a later time as shown in FIG. 3. Thus, the receptacle 10 of the present disclosure can be utilized with a beverage container 100 to allow a person to be able to hold a beverage and a foodstuff in one hand and also can be utilized without a beverage container 100 to provide a compact, easy to transport storage device for foodstuffs 16, 18.

Referring to FIGS. 1-7, 11, 12, and 14, use of a receptacle 10 of the present disclosure will now be described. A receptacle 10 of the present disclosure can be utilized in any food service environment including fast food restaurants and stadium event food services. A user can select a wall component 14 in the first configuration (FIG. 11) in which the wall component 14 is flat. Next, the wall component 14 can be quickly transitioned from the first configuration (FIG. 11) to the second configuration (FIG. 12) as described above.

Next, with the wall component 14 in the second configuration, the wall component 14 can be secured and connected to the lid component 12. For example, the locking tabs 58 of the wall component 14 can be engaged with respective slots 38 of the lid component 12 for securing the wall component 14 to the lid component 12 as described above. Additionally, the third connection portion 50 can receive the straw receiving portion 26 therethrough as shown in FIGS. 1 and 6. In this manner, the third connection portion 50 acts as a physical barrier to prevent wall component 14 from significant relative movement relative to the lid component 12.

Next, with the cover 46 in the open position, a user can select any foodstuffs to be placed in the first compartment 64, the second compartment 66, and the condiment compartment 28. As described above, the receptacle 10 of the present disclosure can be used to contain any foodstuffs. Also, the first compartment 64, the second compartment 66, and the condiment compartment 28 of the receptacle 10 of the present disclosure can be used to contain any combination of foodstuffs.

In one embodiment, the lid component 12 may include a holding portion 35 (FIG. 7) disposed on a bottom surface 37 of the bottom wall 24 of the lid component 12. The holding portion 35 enable a user a portion to securely grasp while placing foodstuffs 16, 18 within the receptacle 10.

Once desired foodstuffs are properly positioned within the compartments 28, 64, 66 of the receptacle 10, the cover 46 can be transitioned to the closed position to securely enclose the foodstuffs 16, 18 within the receptacle 10.

Next, the receptacle 10 can be easily secured to a container 100 with a beverage therein. The lid component 12 of the receptacle 10 can be secured to a container 100 in the same manner that conventional lids are secured to beverage containers. For example, the lid component 12 may include a locking lip portion 68 that is removably securable to a top rim of the container 100 in a known manner.

Referring to FIGS. 1 and 2, the receptacle 10 is now attached to a container 100 containing a beverage while holding a first foodstuff 16 and a second foodstuff 18 therein. A user is now able to hold a beverage and a foodstuff in one hand using a receptacle 10 of the present disclosure. When desired, a user may also insert a straw through the straw receiving portion 26 of the lid component 12 to drink the beverage within the container 100.

A receptacle 10 of the present disclosure can be utilized in any food service environment including fast food restaurants and stadium event food services. The receptacle 10 is easily attachable to a container 100 containing a beverage while holding a plurality of foodstuffs therein. The receptacle 10 allows a person in the car and/or on the go to be able to hold a beverage and a foodstuff in one hand. Additionally, a person in the car can easily store a beverage and a foodstuff in a single car cup holder for ease of eating and/or drinking in a car by utilizing a receptacle 10 of the present disclosure.

A receptacle 10 of the present disclosure also can be used in a home environment. For example, the lid component 12 and the wall component 14 may be formed of stronger materials thereby allowing the lid component 12 and the wall component 14 to be reusable and cleaned in a dishwasher. A reusable receptacle 10 would allow people to be able to hold a beverage and a foodstuff in one hand at home. Such a receptacle 10 is a great option for young children having a snack while watching television and during similar activities.

Also, a receptacle of the present disclosure can be utilized to display marketing and/or advertising information on an exterior surface of a sidewall of the receptacle. In one embodiment, a receptacle of the present disclosure can include a light-emitting diode (LED) to provide lights and/or colors to display desired information and/or advertising information on an exterior surface of a sidewall of the receptacle. In another embodiment, a receptacle of the present disclosure can include a holographic image to provide a three-dimensional image to display desired information and/or advertising information on an exterior surface of a sidewall of the receptacle.

Figure 8:
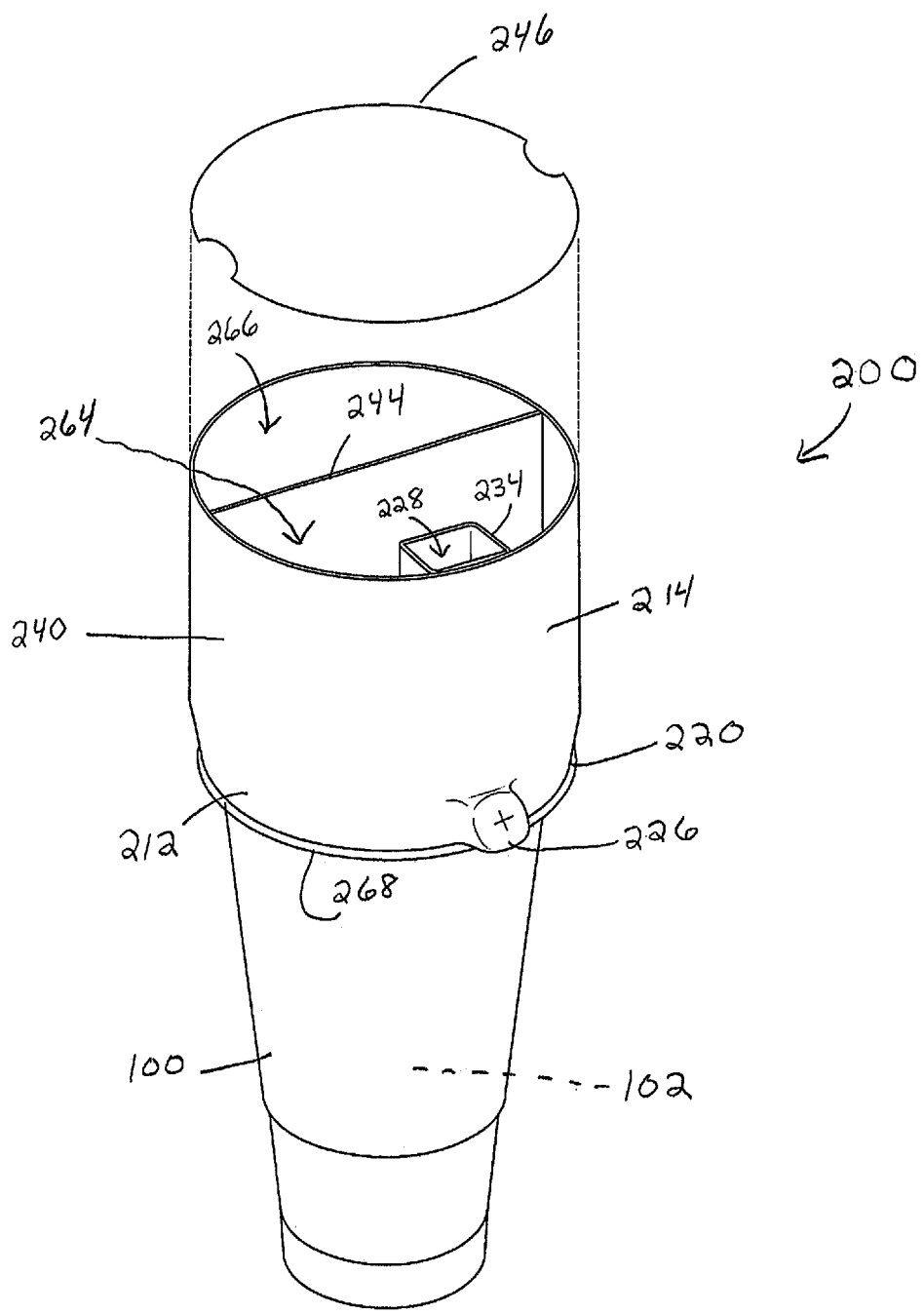
FIG. 8 is a perspective view of a receptacle attached to a beverage container in accordance with another embodiment of the present invention.
Figure 9:
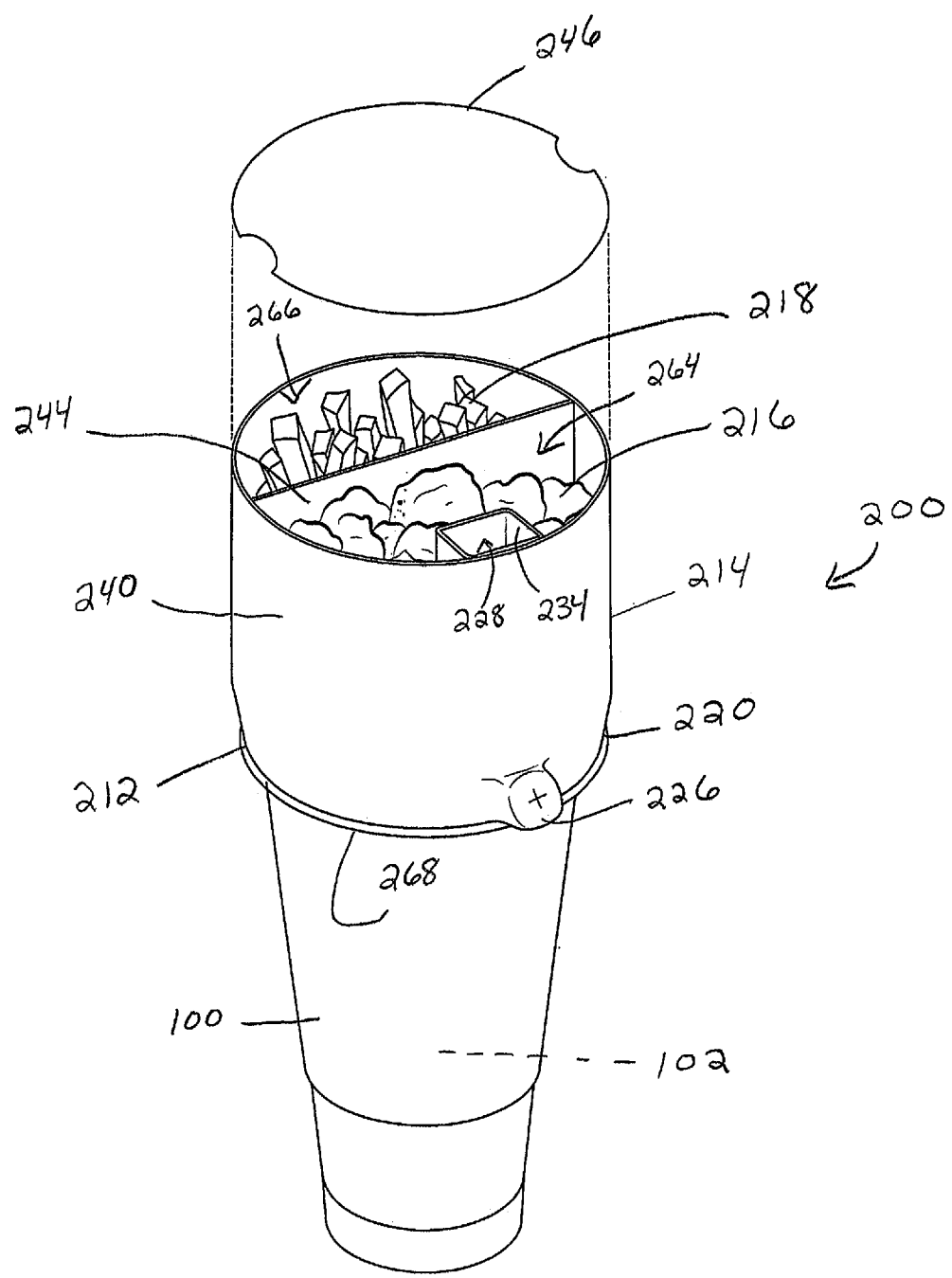
FIG. 9 is a perspective view of a receptacle storing a first foodstuff and a second foodstuff and attached to a beverage container in accordance with another embodiment of the present invention.
Figure 10:
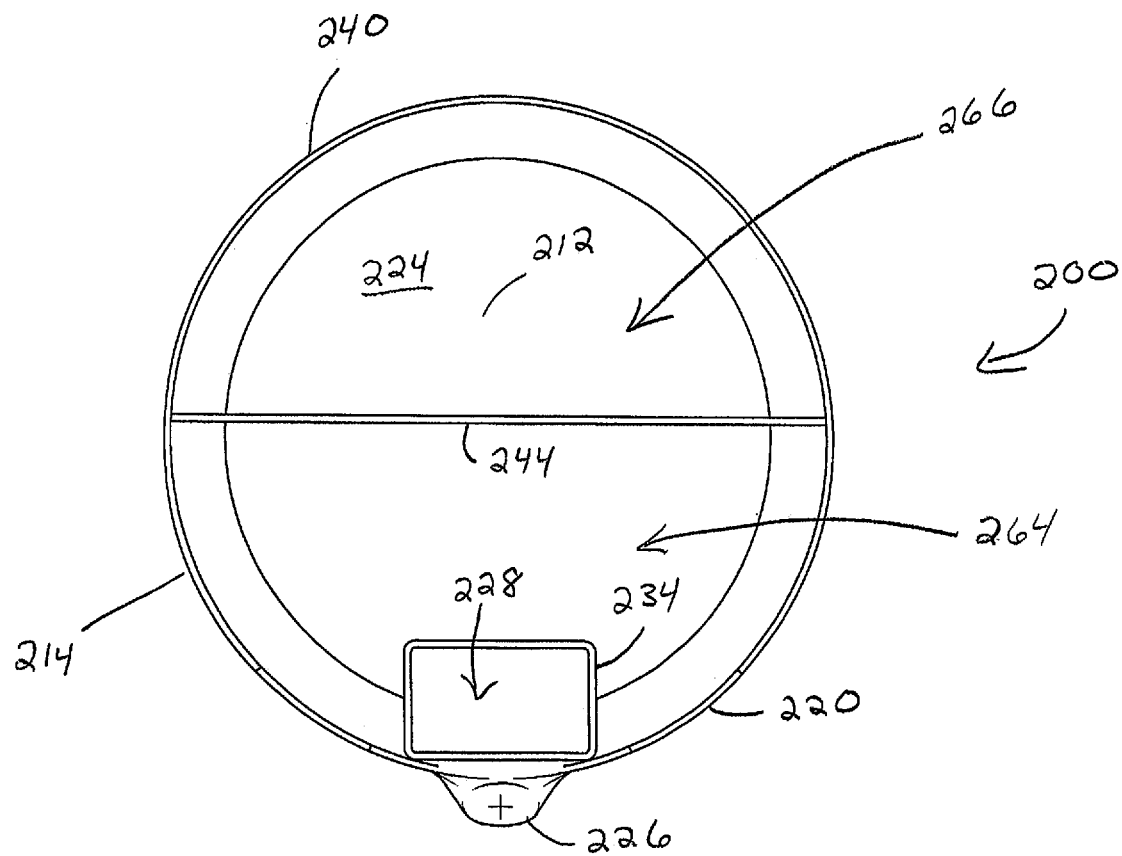
FIG. 10 is a top elevation view of a receptacle in accordance with another embodiment of the present invention.

FIGS. 8-10 illustrate another exemplary embodiment of a receptacle of the present disclosure. Referring to FIGS. 8-10, a receptacle 200 of the present disclosure is adapted to hold, contain, and/or store a foodstuff. For example, the receptacle 200 is adapted to hold a first foodstuff 216 and/or a second foodstuff 218 therein as shown in FIG. 9. The receptacle 200 is attachable to a container 100 defining an interior 102 for receiving a beverage. The receptacle 200 of the present disclosure allows a person to be able to hold a beverage and a foodstuff in one hand.

Referring to FIGS. 8-10, in one embodiment, a receptacle 200 generally includes a base portion 212, a wall portion 214, a peripheral portion 220, a bottom wall 224, a straw receiving portion 226, a condiment compartment 228, a sidewall 240, a divider wall 244, a cover 246, a first compartment or first receiving portion 264, a second compartment or second receiving portion 266, and a locking lip portion 268. The receptacle 200 is formed of a single, integral component. For example, the base portion 212 and the wall portion 214 are formed of a single, integral component.

In one embodiment, the base portion 212 includes the straw receiving portion 226 located at a peripheral portion 220 of the base portion 212. In one embodiment, the straw receiving portion 226 extends outward from the base portion 212 at an angle. In this manner, a straw can be inserted through the straw receiving portion 226 at the peripheral portion 220 of the base portion 212 at an angle that allows the straw to be properly received within the beverage container 100.

The straw receiving portion 226 is located at the peripheral portion 220 of the base portion 212 so that insertion of a straw through the straw receiving portion 226 does not interfere with the space of the receptacle 200, i.e., the first compartment 264 and the second compartment 266, for containing a foodstuff 216, 218. For example, a conventional lid for a beverage container contains a straw hole in the middle of the lid. Such an orientation of the straw hole interferes with the top of the lid. The straw receiving portion 226 of the receptacle 200 of the present disclosure is positioned at the peripheral portion 220 so that the entirety of the first compartment 264 and the second compartment 266 are able to receive a foodstuff 216, 218 with no interference from a straw. The receptacle 200 of the present disclosure provides a first compartment 264 and a second compartment 266 that utilize a maximum surface area for receiving a foodstuff 216, 218.

In one embodiment, the wall portion 214 extends vertically from the peripheral portion 220 of the base potion 212. The wall portion 214 and the base portion 212 define a first compartment 264. The condiment compartment 228 includes a condiment compartment wall 234 that defines the condiment compartment 228 therein. The condiment compartment 228 is spaced apart from the first compartment 264. In one embodiment, the receptacle 200 includes a single first compartment or first receiving portion 264.

In other embodiments, the receptacle 200 includes a divider wall 244. The divider wall 244 and the wall portion 214 together define a first compartment or a first receiving portion 264 and a second compartment or a second receiving portion 266.

In this manner, a first foodstuff 216 is storable within the first compartment 264 and a second foodstuff 218 is storable within the second compartment 266. Additionally, a condiment is receivable within the condiment compartment 228. For example, a receptacle 200 of the present disclosure may be used by a food provider to place chicken nuggets, i.e., a first foodstuff 216, within the first compartment 264, french fries, i.e., a second foodstuff 218, within the second compartment 266, and ketchup and/or barbecue sauce, i.e., a condiment, within the condiment compartment 228. The receptacle 200 of the present disclosure can be used to contain any foodstuffs. Also, the first compartment 264, the second compartment 266, and the condiment compartment 228 of the receptacle 200 of the present disclosure can be used to contain any combination of foodstuffs.

In other embodiments, additional divider walls could be positioned within the receptacle 200 to form any number of compartments for containing any number of foodstuffs. For example, a second divider wall could be positioned within the receptacle 200 bisecting the divider wall 244 to form four separate compartments for containing foodstuffs.

In one embodiment, the receptacle 200 includes a cover 246 that is removably attachable to the wall portion 214. With the cover 246 attached to the wall portion 214, the cover 246 encloses the first compartment 264 and the second compartment 266 as described above.

In one embodiment, the receptacle 200 may be formed of various plastics, fiber materials, or similar materials known in the art. For example, the receptacle 200 may be formed of polystyrene, a styrene based material, a fiber based material, or other similar material. In one embodiment, the receptacle 200 is made of a material that has a sufficient rigidity to support a foodstuff 216, 218. In one embodiment, the receptacle 200 is made of an insulating material. In other embodiments, the receptacle 200 can be made of a biodegradable material or a recyclable material.

A receptacle 200 of the present disclosure also can be used once a beverage is finished within the container 100. For example, a user can remove the receptacle 200 from the container 100 and store and/or refrigerate the foodstuffs 216, 218 within the receptacle 200 until a later time as described above. Thus, the receptacle 200 of the present disclosure can be utilized with a beverage container 100 to allow a person to be able to hold a beverage and a foodstuff in one hand and also can be utilized without a beverage container 100 to provide a compact, easy to transport storage device for foodstuffs 216, 218.

Referring to FIGS. 8-10, use of a receptacle 200 of the present disclosure will now be described. A receptacle 200 of the present disclosure can be utilized in any food service environment including fast food restaurants and stadium event food services. A user can select a desired receptacle 200.

Next, with the cover 246 in the open position, a user can select any foodstuffs to be placed in the first compartment 264, the second compartment 266, and the condiment compartment 228. As described above, the receptacle 200 of the present disclosure can be used to contain any foodstuffs. Also, the first compartment 264, the second compartment 266, and the condiment compartment 228 of the receptacle 200 of the present disclosure can be used to contain any combination of foodstuffs.

Once desired foodstuffs are properly positioned within the compartments 228, 264, 266 of the receptacle 200, the cover 246 can be transitioned to the closed position to securely enclose the foodstuffs 216, 218 within the receptacle 200.

Next, the receptacle 200 can be easily secured to a container 100 with a beverage therein. The base portion 212 of the receptacle 200 can be secured to a container 100 in the same manner that conventional lids are secured to beverage containers. For example, the base portion 212 may include a locking lip portion 268 that is removably securable to a top rim of the container 100 in a known manner.

Referring to FIG. 9, the receptacle 200 is now attached to a container 100 containing a beverage while holding a first foodstuff 216 and a second foodstuff 218 therein. A user is now able to hold a beverage and a foodstuff in one hand using a receptacle 200 of the present disclosure. When desired, a user may also insert a straw through the straw receiving portion 226 of the receptacle 200 to drink the beverage within the container 100.

A receptacle 200 of the present disclosure can be utilized in any food service environment including fast food restaurants and stadium event food services. The receptacle 200 is easily attachable to a container 100 containing a beverage while holding a plurality of foodstuffs therein. The receptacle 200 allows a person in the car and/or on the go to be able to hold a beverage and a foodstuff in one hand. Additionally, a person in the car can easily store a beverage and a foodstuff in a single car cup holder for ease of eating and/or drinking in a car by utilizing a receptacle 200 of the present disclosure.

A receptacle 200 of the present disclosure also can be used in a home environment. For example, the receptacle 200 may be formed of stronger materials thereby allowing the receptacle 200 to be reusable and cleaned in a dishwasher. A reusable receptacle 200 would allow people to be able to hold a beverage and a foodstuff in one hand at home. Such a receptacle 200 is a great option for young children having a snack while watching television and during similar activities.

Also, a receptacle of the present disclosure can be utilized to display marketing and/or advertising information on an exterior surface of a sidewall of the receptacle. In one embodiment, a receptacle of the present disclosure can include a light-emitting diode (LED) to provide lights and/or colors to display desired information and/or advertising information on an exterior surface of a sidewall of the receptacle. In another embodiment, a receptacle of the present disclosure can include a holographic image to provide a three-dimensional image to display desired information and/or advertising information on an exterior surface of a sidewall of the receptacle.

Figure 13:
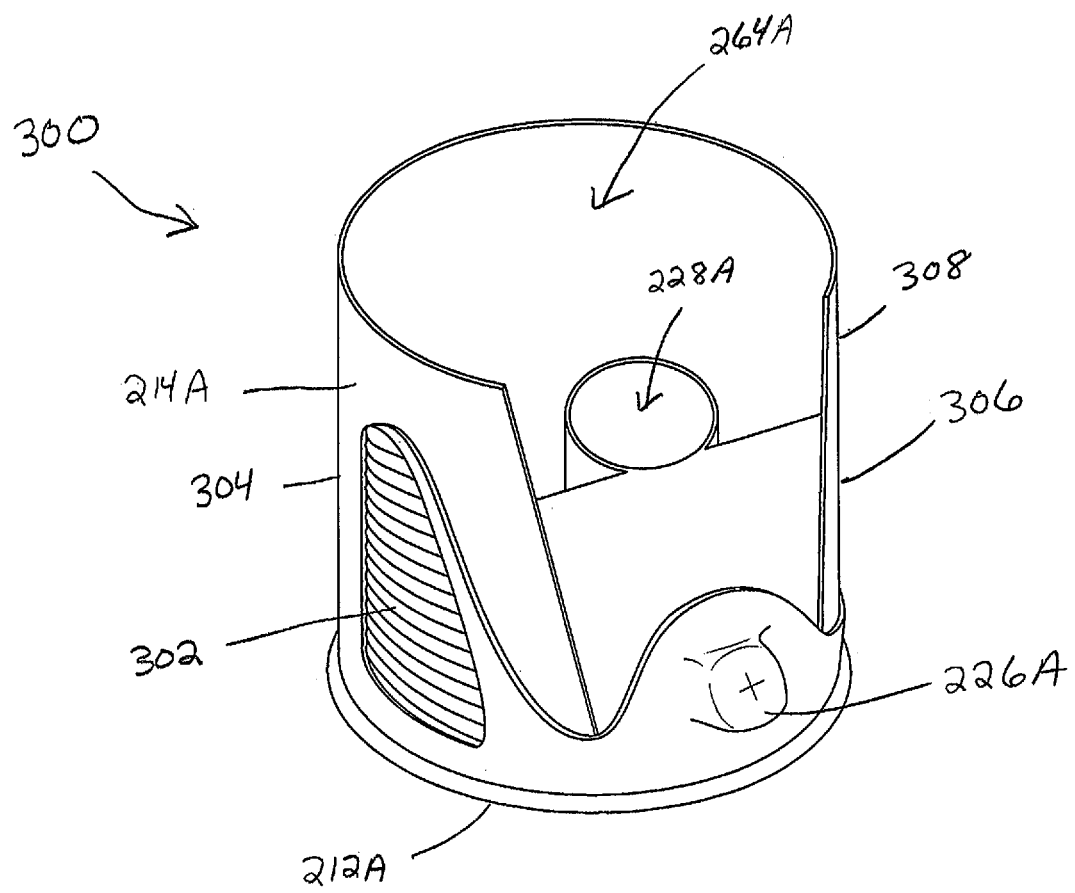
FIG. 13 is a perspective view of a receptacle in accordance with another embodiment of the present invention.

FIG. 13 illustrates another exemplary embodiment. The embodiment illustrated in FIG. 13 includes similar components to the embodiment illustrated in FIGS. 8-10, and the similar components are denoted by a reference number followed by the letter A. For the sake of brevity, these similar components and the similar steps of using receptacle 300 (FIG. 13) will not all be discussed in conjunction with the embodiment illustrated in FIG. 13.

Referring to FIG. 13, in one embodiment, the receptacle 300 includes a first finger grip indentation 302 disposed on a first side 304 of the wall portion 214A and a second finger grip indentation 306 disposed on a second side 308 of the wall portion 214A. In one embodiment, the second finger grip indentation 306 is spaced apart from the first finger grip indentation 302. The finger grip indentations 302, 306 provide a gripping surface to help a user hold and/or grip a receptacle 300 of the present disclosure.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A receptacle removably attachable to a container defining an interior for receiving a beverage, the receptacle comprising:

a lid component having a straw receiving portion located at a peripheral portion of the lid component and a first connection portion, the peripheral portion of the lid component includes a sidewall that extends upwards from a lid bottom and defines a first cavity therein, and a condiment compartment wall that extends upwards from the lid bottom and defines a second cavity therein, the second cavity separate from the first cavity, the condiment compartment wall extends to a condiment compartment wall height that is beyond a height of the sidewall, and the second cavity is enclosed on all lateral sides by the condiment compartment wall and a top side of the second cavity is open; and a wall component having a second connection portion, the wall component transitionable between a first configuration in which the wall component is flat and a second configuration in which the wall component is connectable to the lid component.

2. The receptacle of claim 1, wherein the straw receiving portion extends obliquely from the sidewall.

3. The receptacle of claim 1, wherein the wall component includes a cover, and wherein, with the wall component in the second configuration and connected to the lid component, the cover is transitionable between an open position and a closed position in which the cover encloses the first cavity and the second cavity.

* * * * *